(12) United States Patent
Fisher (10) Patent No.: US 9,738,137 B2
(45) Date of Patent: Aug. 22, 2017

(54) AIR CONDITIONING CONDENSER SYSTEM FOR A VEHICLE

(71) Applicant: Horton Emergency Vehicles, Grove City, OH (US)

(72) Inventor: Eric Fisher, Columbus, OH (US)

(73) Assignee: Halcore Group, Inc., Grove City, OH (US)

( * ) Notice: Subject to any disclaimer, the term of this patent is extended or adjusted under 35 U.S.C. 154(b) by 308 days.

(21) Appl. No.: 13/974,667

(22) Filed: Aug. 23, 2013

(65) Prior Publication Data

US 2015/0053369 A1 Feb. 26, 2015

(51) Int. Cl.
*B60H 1/00* (2006.01)
*B60H 1/32* (2006.01)
*F25B 49/02* (2006.01)

(52) U.S. Cl.
CPC ......... *B60H 1/3227* (2013.01); *F25B 49/027* (2013.01); *B60H 2001/00235* (2013.01); *B60H 2001/3251* (2013.01); *B60H 2001/3277* (2013.01)

(58) Field of Classification Search
CPC ...... B60H 2001/00235; B60H 1/00521; F25B 2600/111; F25B 49/027; F25B 2700/195
USPC ... 62/244, DIG. 16, 428, 429, 181, 183, 239
See application file for complete search history.

(56) References Cited

U.S. PATENT DOCUMENTS

| | | | |
|---|---|---|---|
| 3,366,167 A * | 1/1968 | Dapper | 165/288 |
| 3,390,539 A * | 7/1968 | Miner | 62/184 |
| 3,638,445 A * | 2/1972 | Lavigne et al. | 62/184 |
| 3,811,292 A * | 5/1974 | Hoenisch | 62/183 |
| 3,984,224 A | 10/1976 | Dawkins | |
| 4,592,207 A | 6/1986 | Rummel | |
| 4,608,834 A | 9/1986 | Rummel | |
| 4,622,831 A | 11/1986 | Grupa | |
| 4,926,655 A * | 5/1990 | King | 62/244 |
| 5,005,372 A * | 4/1991 | King | 62/244 |
| 5,138,844 A | 8/1992 | Clanin et al. | |
| 5,184,474 A * | 2/1993 | Ferdows | 62/244 |
| 5,222,373 A * | 6/1993 | Waldschmidt | 62/239 |
| 6,601,397 B2 | 8/2003 | Pham et al. | |
| 6,751,975 B1 * | 6/2004 | Reimann | 62/279 |
| 7,275,378 B2 | 10/2007 | Errington et al. | |
| 8,366,167 B2 | 2/2013 | Sartin et al. | |
| 2002/0073723 A1 | 6/2002 | Hoos | |

(Continued)

FOREIGN PATENT DOCUMENTS

DE 102008005539 * 1/2009
EP 1968811 9/2008

(Continued)

OTHER PUBLICATIONS

Hankin, DE102008005539TRANS (English Translation), Jan. 2009.*

(Continued)

*Primary Examiner* — Judy Swann
*Assistant Examiner* — Eric Ruppert
(74) *Attorney, Agent, or Firm* — Hovey Williams LLP (57) ABSTRACT

Condenser systems for vehicle air conditioning systems and processes for controlling condenser systems are disclosed. The condenser systems include a plurality of fans that can be activated and/or deactivated based on a load indicating parameter of the heat transfer circuit of the air conditioning system.

22 Claims, 10 Drawing Sheets

(56) References Cited

U.S. PATENT DOCUMENTS

| | | | |
|---|---|---|---|
| 2002/0157409 A1* | 10/2002 | Pham et al. ................. | 62/228.3 |
| 2003/0079487 A1* | 5/2003 | Matonog ............ | B60H 1/00264 |
| | | | 62/239 |
| 2004/0040325 A1* | 3/2004 | Evans ................ | B60H 1/00428 |
| | | | 62/235.1 |
| 2005/0092005 A1* | 5/2005 | Wunderlich et al. ........... | 62/244 |
| 2006/0033360 A1* | 2/2006 | Taylor ........................ | 296/186.1 |
| 2010/0218529 A1* | 9/2010 | Melbostad et al. ............. | 62/244 |
| 2012/0049556 A1 | 3/2012 | Barnes et al. | |

FOREIGN PATENT DOCUMENTS

| | | | | |
|---|---|---|---|---|
| GB | 2317445 | * | 3/1998 | ......... B60H 1/00428 |
| KR | 1020070087997 | * | 8/2007 | |

OTHER PUBLICATIONS

Kwon, KR1020070087997TRANS (English Translation), Aug. 2007.*
Rooftop Condenser K-410—The roof mount unit that's top rated for its ultra-low profile; MCC—Mobile Climate Control; MCC Roof Mount Condensers; www.mcc-hvac.com; Feb. 2013; 2 pages.
Wheeled Coach Introduces Cool-Bar; www.jems.com/article/product-announcements/wheeled-coach-introduces-cool; Apr. 13, 2011; 1 page.

* cited by examiner

AIR CONDITIONING CONDENSER SYSTEM FOR A VEHICLE

FIELD OF THE INVENTION

This invention relates generally to vehicle air conditioning condenser systems.

BACKGROUND

Vehicle air conditioning systems generally include condenser systems for cooling a heat transfer medium utilized in the air conditioning system. The condenser system is generally located in the engine compartment. While in certain vehicles, such as emergency vehicles having a driver compartment and a patient compartment, a primary condenser system located in the engine compartment may be sufficient to cool the driver compartment, an auxiliary air conditioning system having an auxiliary condenser system may be required to cool the patient compartment. However, auxiliary condenser systems can be bulky and can take away space needed for other essential vehicle components. For this and other reasons, certain vehicles have positioned auxiliary condenser systems on top of the roof, e.g., the patient compartment roof. However, placing a condenser system on top of a vehicle roof can increase the vehicle's clearance height and create increased aerodynamic drag. In light of these problems, certain vehicles have positioned auxiliary condenser systems underneath the vehicle. However, having components of a condenser system underneath the vehicle can be problematic in that debris from the road may damage essential condenser system components. Further, such condenser systems may require increased energy to cool condenser coils during the summer, as the condenser coils may be close to a road that is radiating heat. In addition, certain vehicle condenser systems having more than one condenser fan may operate in an inefficient manner, as oftentimes, all the fans may be activated when the air conditioning system is on, even if only one condenser fan is required. Accordingly, there is a need for an air conditioning condenser system for a vehicle having improved efficiency, and that can provide space for other vehicle components.

SUMMARY OF THE INVENTION

In one embodiment of the present invention, there is provided a vehicle air conditioning condenser system for cooling a heat transfer medium flowing through a heat transfer circuit of a vehicle air conditioning system that includes one or more roof-mounted condenser coils. The condenser system includes a sensor operable to measure at least one load indicating parameter of the heat transfer circuit, a plurality of roof-mounted fans operable to supply blowing air to the roof-mounted condenser coils, and a fan controller coupled to the sensor and the plurality of fans and operable to receive the load indicating parameter from the sensor. The fan controller is operable to automatically activate and/or deactivate at least one fan of the plurality of fans without simultaneously activating or deactivating another fan of the plurality of fans. The automatic activation and/or deactivation of the at least one fan is based on the load indicating parameter.

In another embodiment of the present invention, there is provided a process for controlling a roof-mounted air conditioning condenser system that cools a heat transfer medium flowing through a heat transfer circuit of a vehicle air conditioning system. The process includes (a) using a plurality of roof-mounted condenser fans to circulate air through one or more roof-mounted condenser coils, (b) simultaneously with step (a), sensing a load indicating parameter of the heat transfer circuit, and (c) based on the load indicating parameter, automatically activating or deactivating at least one of the condenser fans without simultaneously activating or deactivating another of the condenser fans.

In yet another embodiment of the present invention, there is provided an emergency vehicle that includes a vehicle body having a patient compartment and a driver compartment, and an air conditioning system having a capacity of at least 85,000 btu/hr. The air conditioning system includes a heat transfer circuit, a heat transfer medium, and a condenser system. The heat transfer circuit is configured to circulate the heat transfer medium therethrough. The heat transfer circuit includes one or more condenser coils attached to the roof of the patient compartment. The condenser system includes a pressure sensor, a plurality of fans, and a fan controller. The pressure sensor is operable to measure a pressure of the heat transfer medium in the heat transfer circuit and generate a pressure signal based on the measured pressure. The plurality of fans are operable to supply blowing air to at least a portion of the condenser coils. The fan controller is operable to receive the pressure signal and selectively activate and deactivate individual fans of the plurality of fans based on the pressure signal.

BRIEF DESCRIPTION OF THE FIGURES

Embodiments of the present invention are described herein with reference to the following drawing figures, wherein.

DETAILED DESCRIPTION

Figure 1:
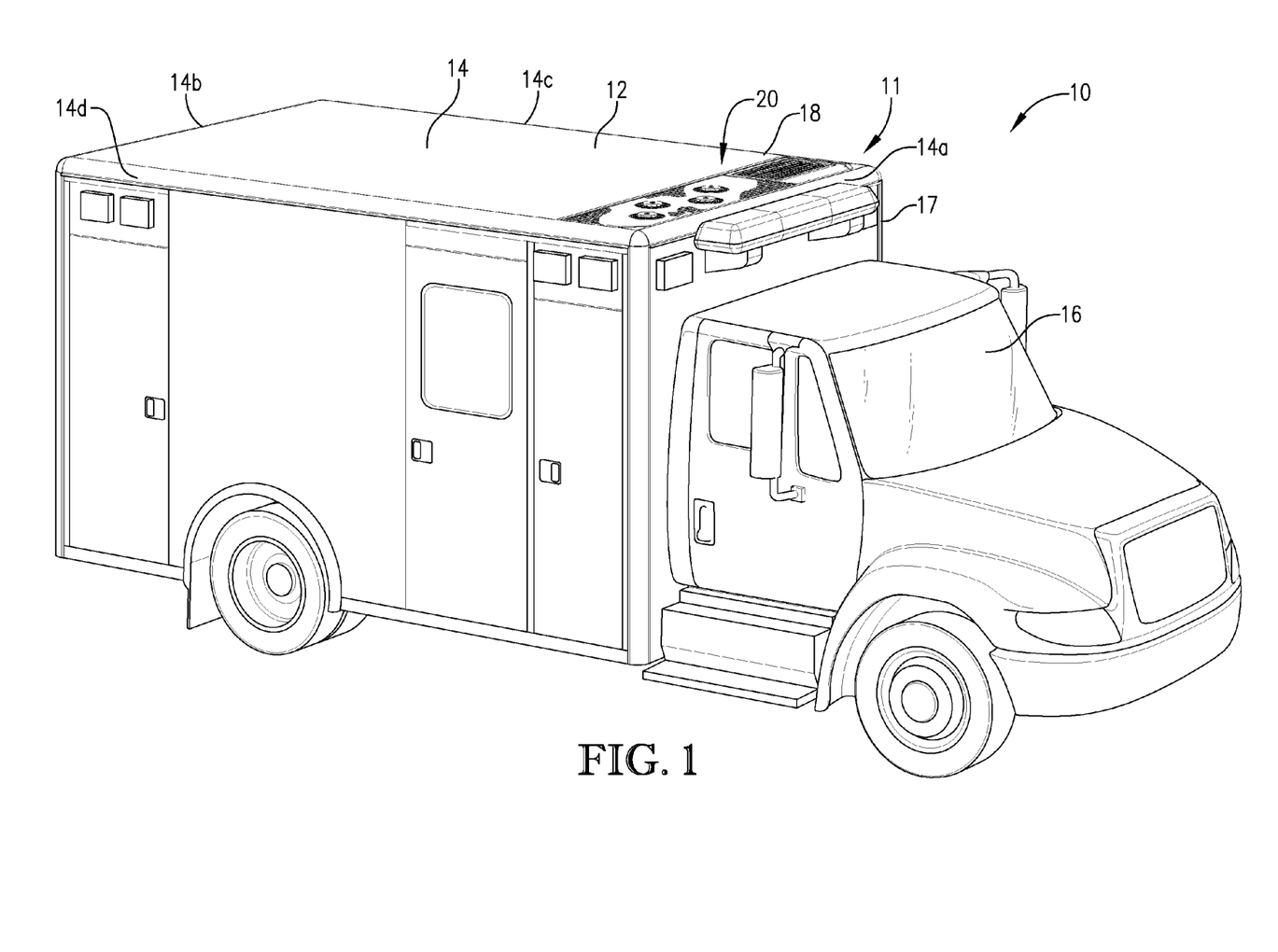
FIG. 1 is a perspective view of an emergency vehicle in accordance with one embodiment of the present invention, particularly showing a condenser system that includes four condenser fans and a solar panel attached to the roof of the patient compartment.

FIG. 1 depicts a vehicle 10 in accordance with one embodiment of the present invention. The vehicle 10 of FIG. 1 may include an air conditioning condenser system 20 attached to the roof 18 of the vehicle 10. The vehicle 10 may be any type of vehicle such as, for example, an emergency vehicle, a bus, a truck, or a recreational vehicle. In a preferred embodiment, the vehicle 10 may be an emergency vehicle.

In one or more embodiments, the vehicle 10 can include a vehicle body 11 that may include a patient compartment 12 and a driver compartment 16. In certain embodiments, the vehicle 10 may include a primary air conditioning system (including a primary condenser system) for cooling the driver compartment 16. In one or more embodiments, the condenser system 20 can be an auxiliary condenser system 20 for use in an auxiliary air conditioning system that can cool the patient compartment 12.

In certain embodiments, such as that depicted in FIG. 1, the condenser system 20 may be attached to the roof 14 of the patient compartment 12. The roof 14 of the patient compartment 12 of FIG. 1 can be defined by a front portion 14a that is adjacent to the driver compartment 16, a back portion 14b opposite the front portion 14a, and two sides 14c and 14d. In the embodiment depicted in FIG. 1, the condenser system 20 may be positioned closer to the front end 14a relative to the back end 14b of the roof 14. In certain embodiments, the condenser system 20 can be located anywhere on the vehicle 10, such as, for example, closer to the back end 14b relative to the front end 14a of the roof 14, or on one of the sidewalls 17 of the patient compartment 12.

Figure 2:
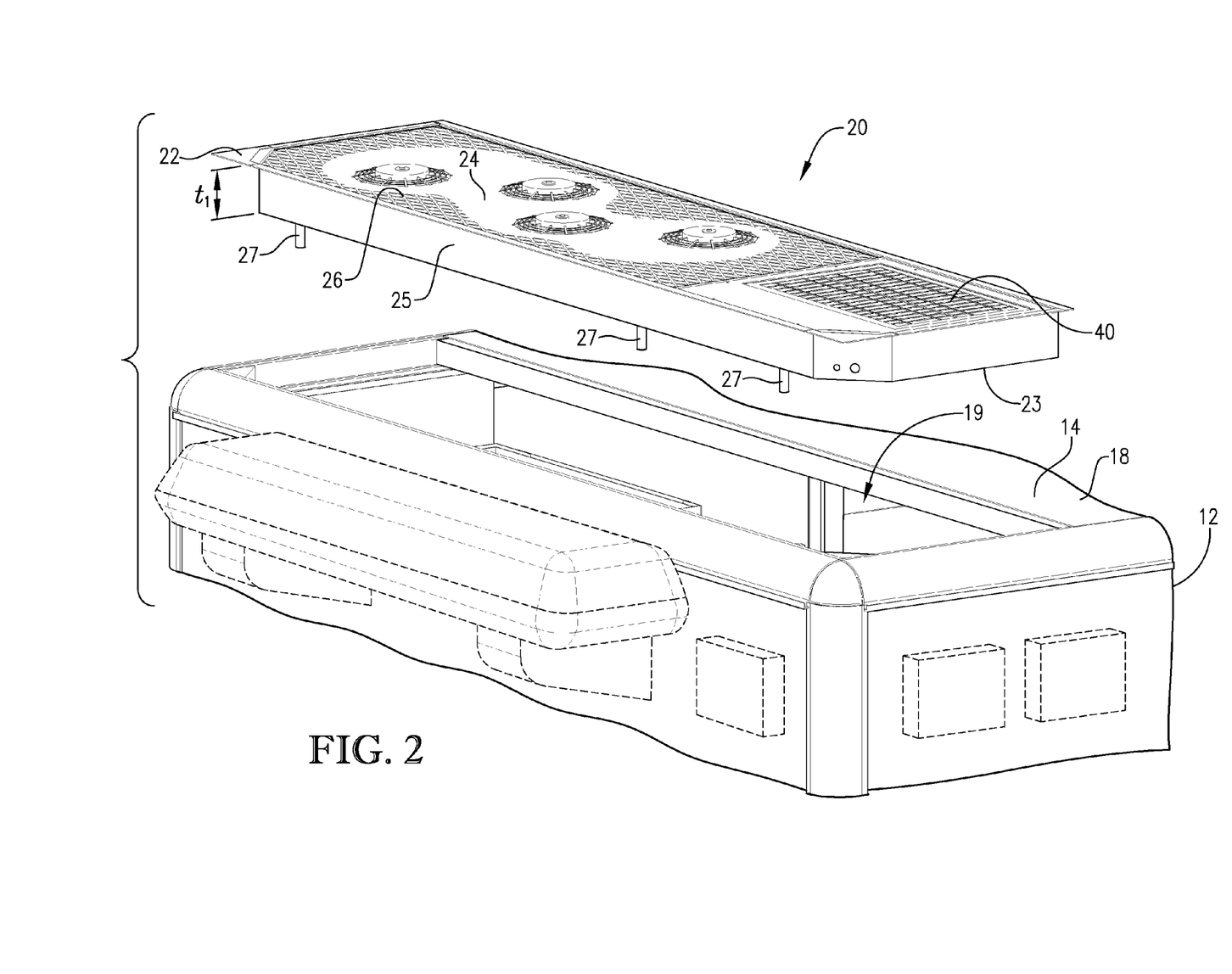
FIG. 2 is a top perspective view of the patient compartment of the emergency vehicle of FIG. 1, particularly showing an opening in the patient compartment to receive the condenser housing of the condenser system.
Figure 3:
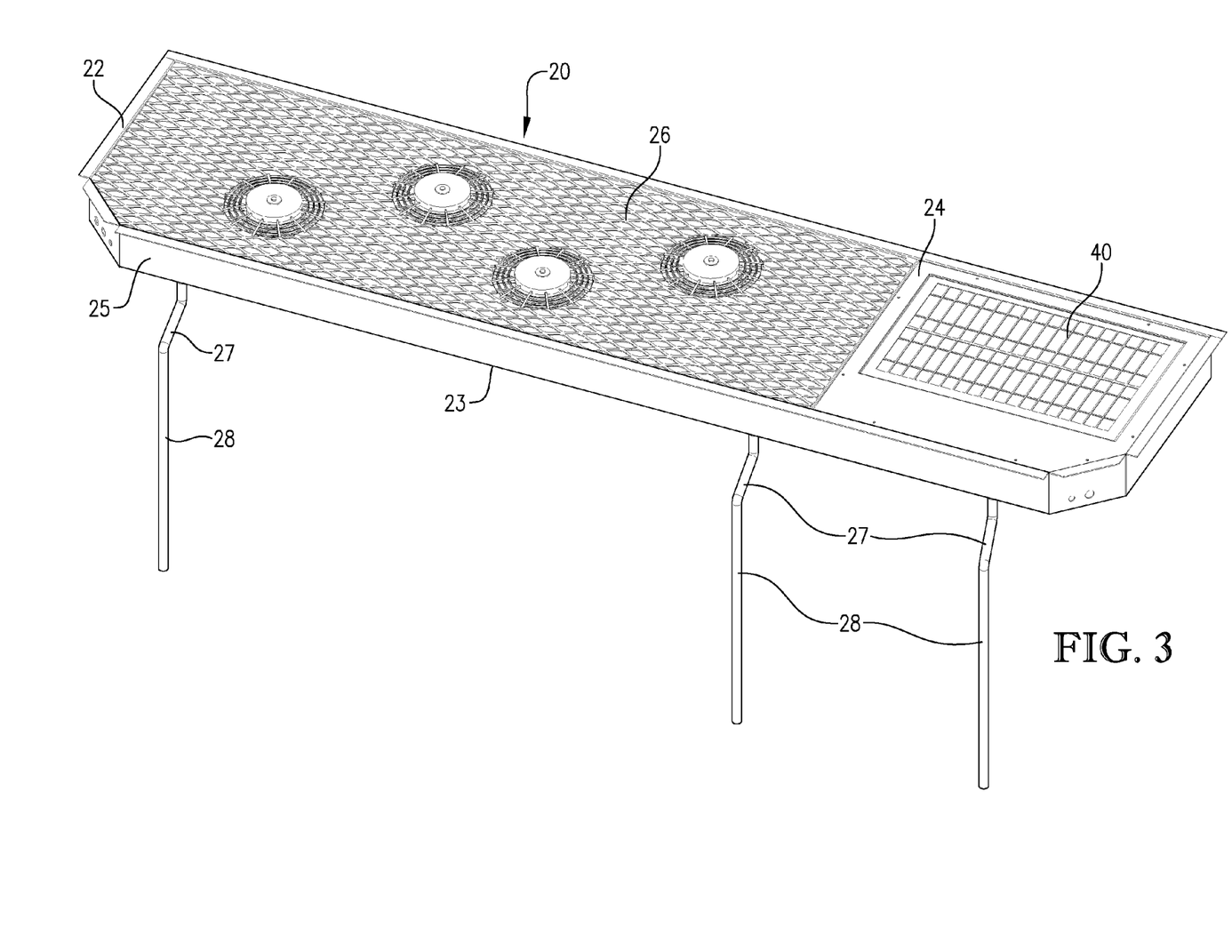
FIG. 3 is top perspective view of the condenser system of FIG. 2, particularly showing a solar panel coupled to the top surface of the condenser housing, four fans positioned near the top surface of the condenser housing, and three drains coupled to the bottom surface of the condenser housing.
Figure 4:
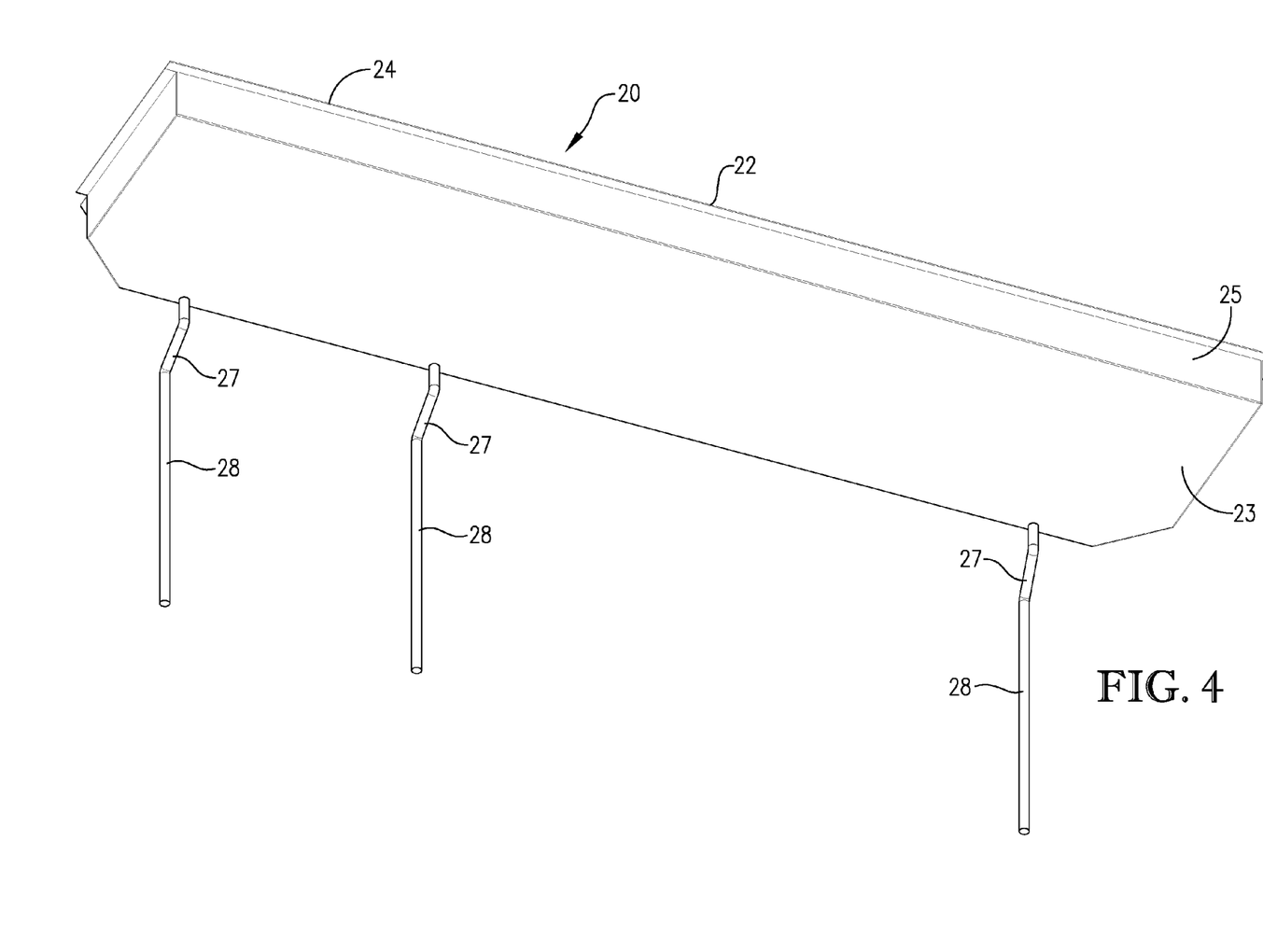
FIG. 4 is a bottom perspective view of the condenser system of FIG. 3, particularly showing three drains coupled to the bottom surface of the condenser housing.

As can be seen in the embodiment depicted in FIGS. 2-4, the condenser system 20 may include a condenser housing 22. In certain embodiments, the condenser housing 22 may be configured for attachment to the roof 18 of the vehicle 10, such as, for example, to the roof 14 of the patient compartment 12. For example, as seen in the embodiment depicted in FIG. 2, the condenser housing 22 may be complimentary in shape to an opening 19 in the roof 14 of the patient compartment 12, so that the condenser housing 22 may be at least partly integrated into the patient compartment 12. In such embodiments, the condenser housing 22 may be secured in place by any manner known to one skilled in the art, such as, for example, by the use of bolts and/or screws, or via welding. The condenser housing 22 may be attached to the roof 14 of the patient compartment 12 in any other manner known to one skilled in the art, such as, for example, the condenser housing 22 may be attached to the roof 14 such that the entire condenser housing 22, or at least a portion thereof, is located on top of the roof 14.

In certain embodiments, the condenser housing 22 of FIGS. 2-4 may include a bottom surface 23, a top surface 24, and at least one sidewall 25. In one or more embodiments, the maximum thickness $t_1$ of the condenser housing 22, measured between the top surface 24 and the bottom surface 23, can be less than 8 inches, 7 inches, 6 inches, 5 inches, or 4 inches.

The condenser housing 22 may be made of any type of material and a specific material can be chosen by one skilled in the art for a particular purpose. In one or more embodiments, the bottom surface 23, the top surface 24, and the sidewall 25 of the condenser housing 22 may include a metal material, such as, for example, aluminum. As best seen in FIGS. 2 and 3, in certain embodiments, the top surface 24 of the condenser housing 22 may be defined by a porous cover 26. The porous cover 26 can be formed of any suitable sheet of material having openings therein for allowing air to flow therethrough and inside the condenser housing 22. In certain embodiments, the porous cover 26 may be formed of a metal mesh (e.g., expanded aluminum or steel). In one or more embodiments, as will be discussed in greater detail below, a solar panel 40 may be coupled to the top surface 24 of the condenser housing 22.

In certain embodiments where the condenser system 20 may be exposed to rain and/or snow, it may be desirable to include a drain 27. In the embodiment depicted in FIGS. 2-4, the condenser system 22 may include at least two, three, or four drains 27. The drains 27 can be any type of device or article capable of removing liquid, e.g., water, from inside the condenser housing 22, and a specific type can be chosen by one skilled in the art for a particular purpose. In certain embodiments, the drains 27 may include a ½ inch conduit 28. In one or more embodiments, the conduit 28 may be any size and a specific size can be chosen by one skilled in art based on the specifications of a particular system.

Figure 5:
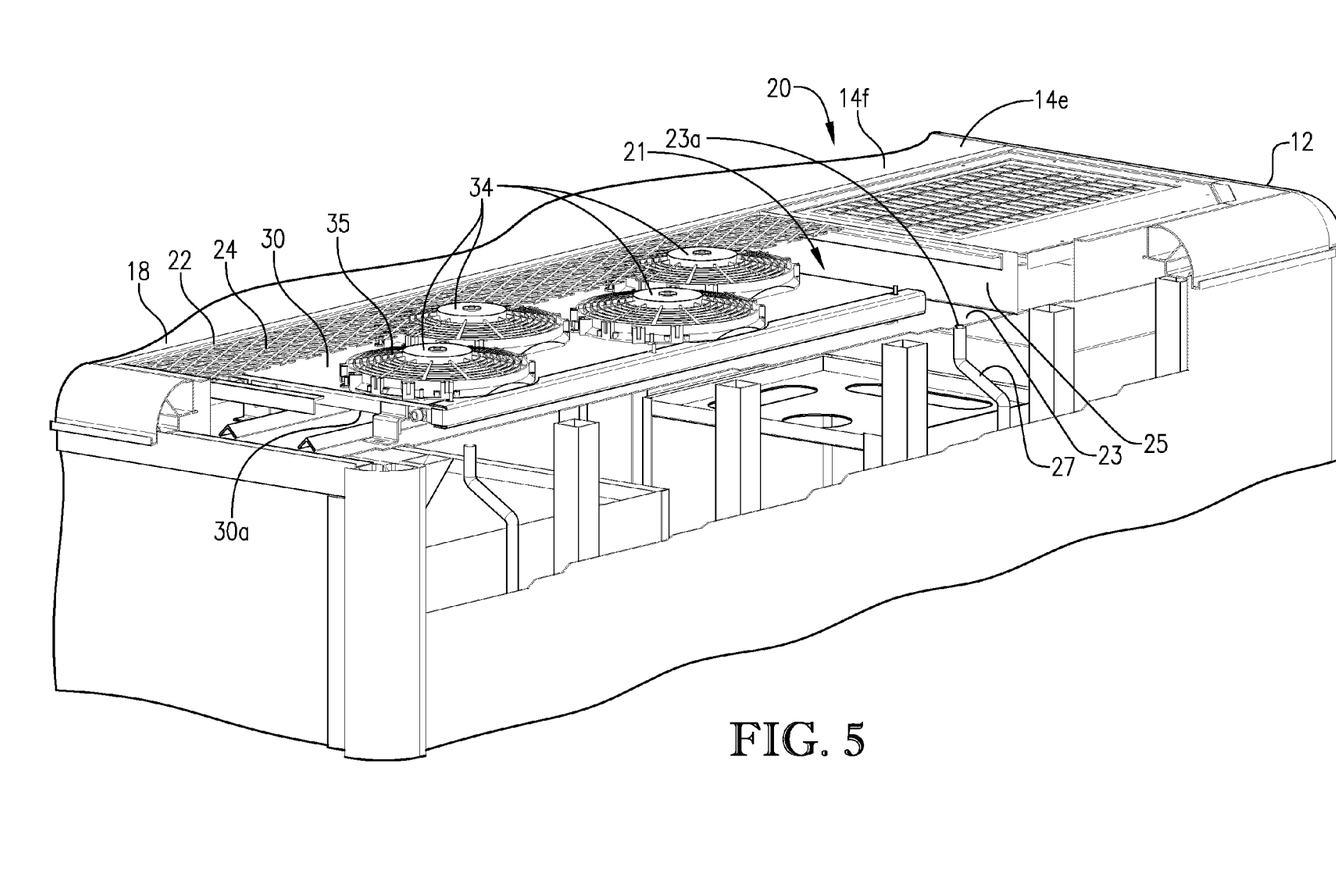
FIG. 5 is a top perspective view of the patient compartment of the emergency vehicle of FIG. 1, having a portion of the patient compartment roof and side removed, particularly showing a drain coupled to a through-opening in the bottom surface of the condenser housing, and four fans positioned on top of the condenser coils, with a portion of the fans positioned beneath the top surface of the condenser housing.

The drains 27 may be coupled to the condenser housing 22 in any manner as long as the drains 27 are configured to remove a liquid from inside the condenser housing 22. For example, in certain embodiments, the drains 27 may be coupled to the bottom surface 23 of the condenser housing 22. As best seen in FIG. 5, the drain 27 may be coupled to a through-opening 23a in the bottom surface 23 of the condenser housing 22 so that the drain 27 is in fluid communication with the interior 21 of the condenser housing 22.

As discussed above, in certain embodiments, the condenser system 20 may be attached to the roof 18 of a vehicle 10 in such a manner that the condenser housing 22 may be at least partly inserted into the vehicle body 11. In such embodiments, the bottom surface 23 and the sidewall 25 of the condenser housing 22 may be positioned below the vehicle roof 18. For example, in the embodiment depicted in FIG. 5, the condenser system 20 may be attached to the roof 14 of the patient compartment 12 such that the bottom surface 23 and at least one sidewall 25 are positioned below the outer surface 14e of the roof 14.

In certain embodiments, such as that depicted in FIG. 5, the top surface 24 of the condenser housing 22 may be configured to be positioned substantially flush with the outer surface 14e of the patient compartment roof portion 14f adjacent to the condenser housing 22. In such embodiments, "substantially flush" means that the top surface 24 of the condenser housing 22 is level, or within 1 inch of being level, with the outer surface of the vehicle roof 18, e.g., the outer surface 14e of the patient compartment roof portion 14f adjacent to the condenser housing 22. In one or more embodiments, the top surface 24 of the condenser housing 22 extends less than 4 inches, 3 inches, 2 inches, or 1 inch above the outer surface 14e of the patient compartment roof portion 14f adjacent to the condenser housing 22. In certain embodiments, no portion of the condenser system 20 extends more than 4 inches, 3 inches, 2 inches, or 1 inch above the outer surface 14e of the patient compartment roof portion 14f adjacent to the condenser housing 22.

As shown in the embodiment depicted in FIG. 5, the condenser system 20 may include one or more condenser coils 30. In certain embodiments, the condenser coils 30 may be positioned in the interior 21 of the condenser housing 22 so that the condenser coils 30 may be positioned between the top surface 24 and bottom surface 23 of the condenser housing 22. The condenser coils 30 can be any type of condenser coils suitable for use in a vehicle air conditioning condenser system 20, and a specific type of condenser coils 30 can be chosen by one skilled in the art for a particular purpose.

Figure 6:
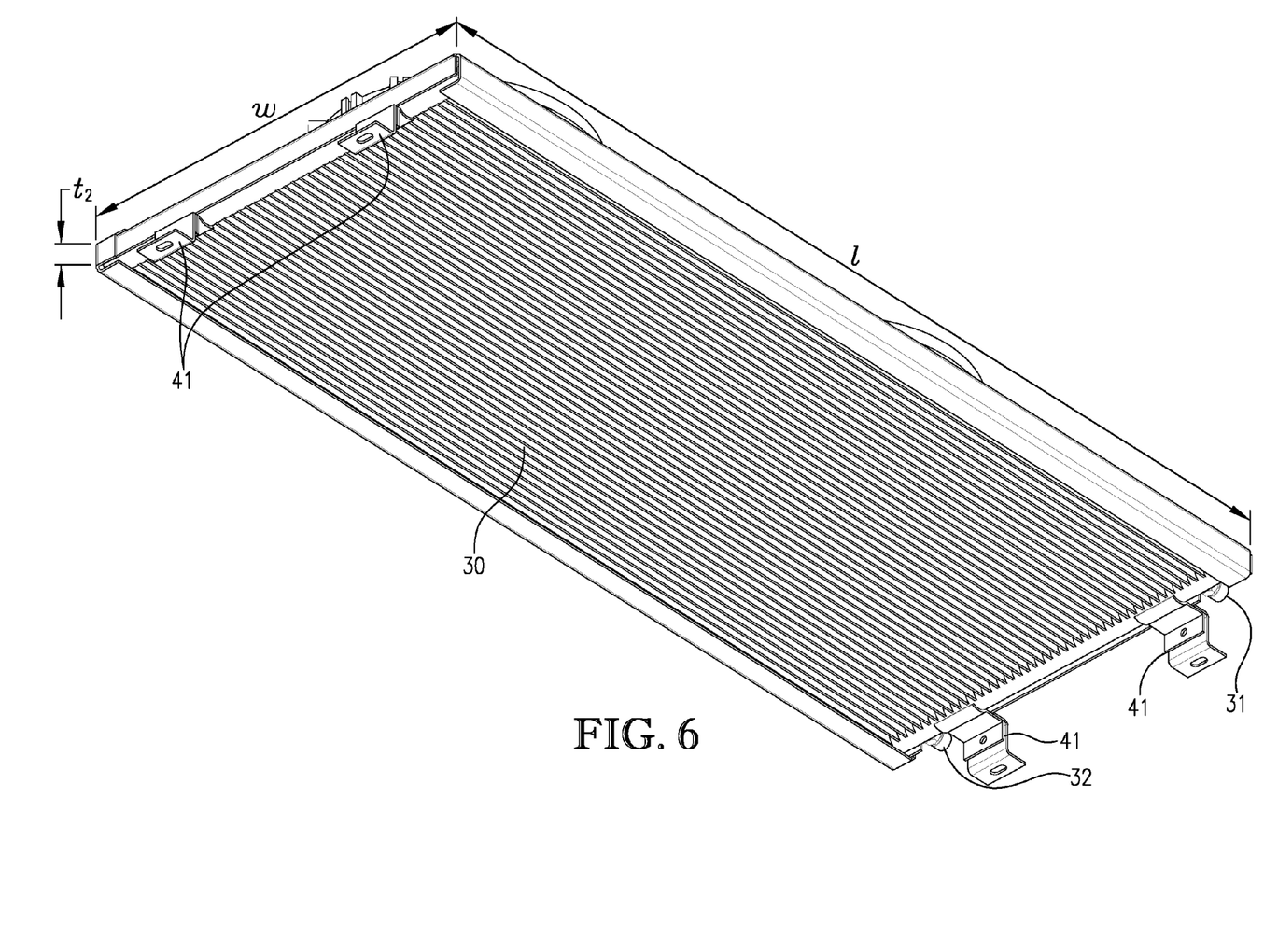
FIG. 6 is a bottom perspective view of the condenser coils in accordance with one embodiment of the present invention, particularly showing four condenser mounts positioned near the corners of the condenser coils and a heat transfer medium inlet and outlet on one side of the condenser coils.

In certain embodiments, such as that depicted in FIG. 6, the condenser coils 30 may have a rectangular shape having a length l, a width w, and a thickness $t_2$. In such embodiments, the condenser coils 30 may have an area defined by the length l and width w of at least 700 inches2, 750 inches2, or 800 inches2. In one or more embodiments, the condenser coils 30 may have a thickness $t_2$ of equal to, or less than, 4 inches, 3 inches, 2 inches or 1 inch.

As best seen in FIG. 6, in one or more embodiments, the condenser coils 30 may include a heat transfer medium inlet 31 and a heat transfer medium outlet 32. In operation, the heat transfer medium inlet 31 may provide an inlet for a heat transfer medium to be cooled by the condenser system 20 and subsequently discharged through the heat transfer medium outlet 32. The heat transfer medium may be any suitable air conditioning refrigerant utilized in a vehicle air conditioning condenser system 20, such as, for example, Freon®.

Returning now to FIG. 5, the condenser system 20 may include at least two, three, or four fans 34. The fans 34 can be any type of fan suitable for use in a vehicle air conditioning condenser system 20. For example, in certain embodiments, each of the fans 34 may be a 12 Volt, 12 inch fan. In one or more embodiments, the fans 34 may be sealed such that the fans 34 can function under water or in the presence of rain and snow.

In the embodiment depicted in FIG. 5, the fans 34 may be positioned on top of the condenser coils 30 and opposite the bottom surface 23 of the condenser housing 22. In certain embodiments, the fans 34 may be positioned entirely or partly within the condenser housing 22. For example, in the embodiment depicted in FIG. 5, a portion of the fans 34 may be positioned beneath the top surface 24 of the condenser housing 22. The fans 34 can be positioned at any location in the condenser system 20 as long as the fans 34 can cool the heat transfer medium inside the condenser coils 30.

In operation, the fans 34 may pull outside air through the top surface 24 of the condenser housing 22, into the interior 21 of the condenser housing 22, up through the bottom surface 30a of the condenser coils 30, and out through the top 35 of the fans 34.

Figure 7:
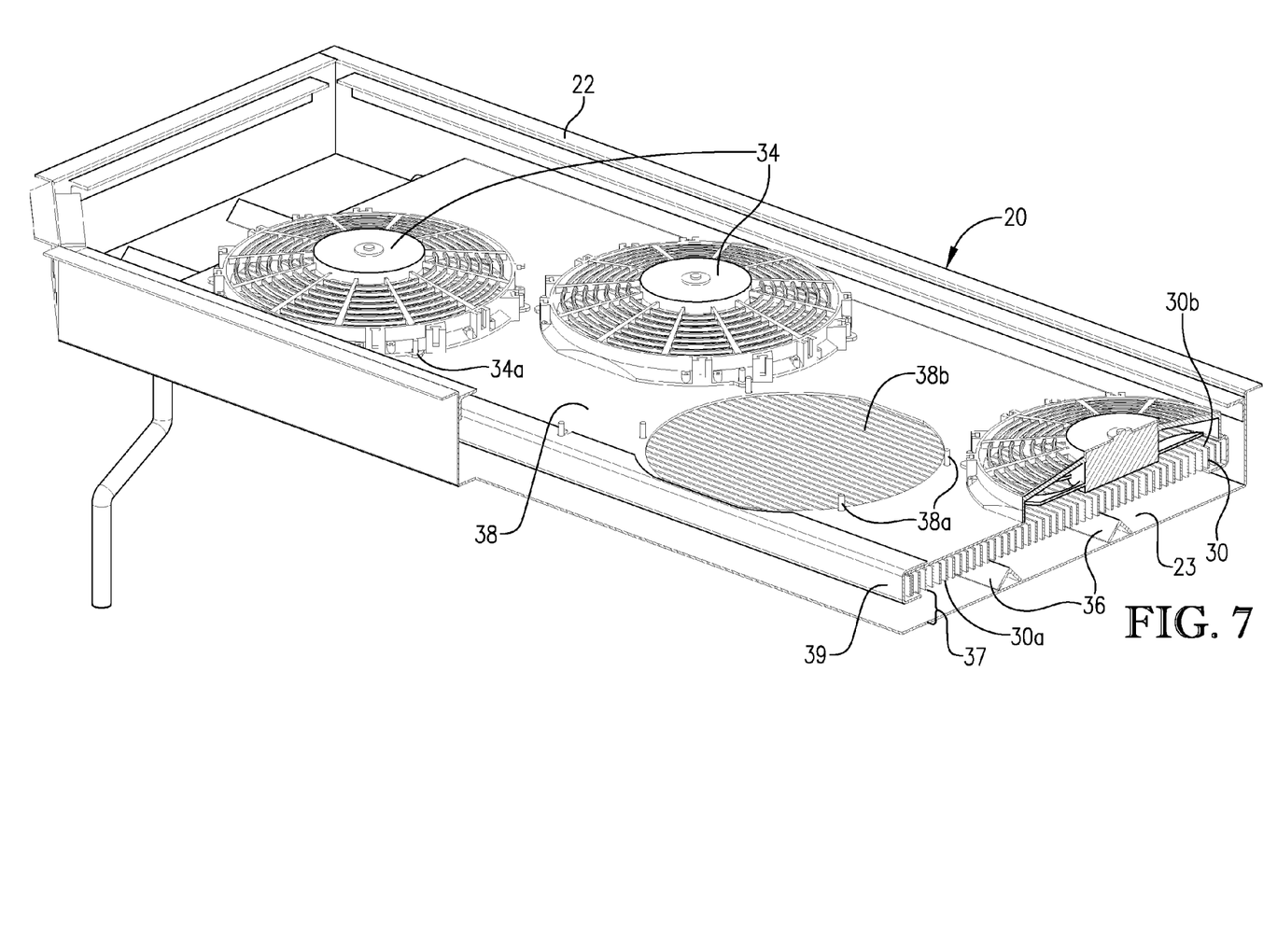
FIG. 7 is a top perspective and cross-sectional view of a condenser system in accordance with one embodiment of the present invention, particularly showing a condenser housing with the top surface removed, a top surface covering material on the condenser coils, fans coupled to the top surface covering material via fan attachment members, and condenser coil spacer mounts positioned underneath the condenser coils.
Figure 8:
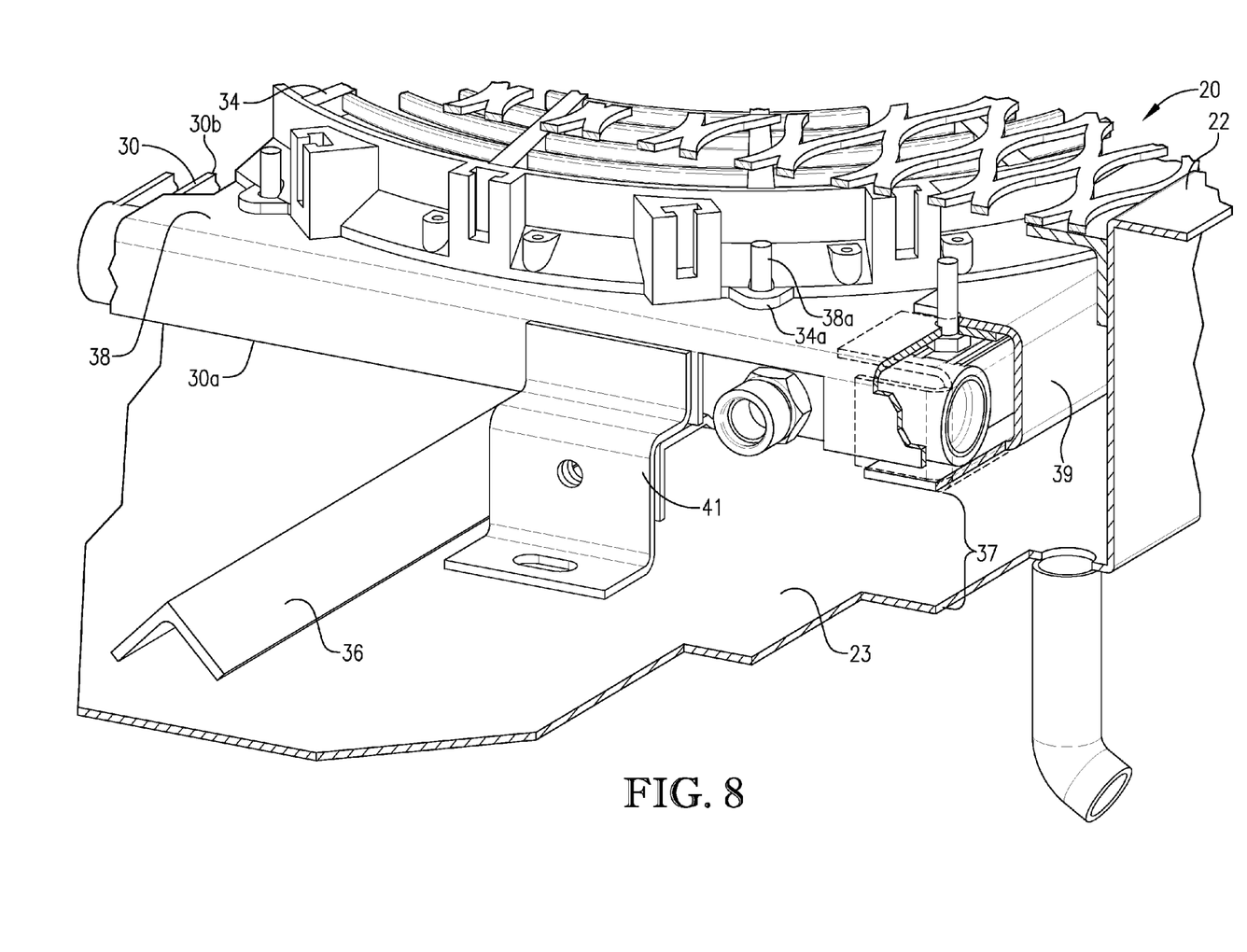
FIG. 8 is a side perspective view of the condenser system of FIG. 7 having a portion of the condenser housing removed and particularly showing one fan coupled to the top surface covering material of the condenser coils via fan attachment members, and one condenser mount attached to the edge covering material of the condenser coils and contacting the bottom surface of the condenser housing.

In one or more embodiments, the condenser system 20 may include condenser coil supports 36 to prevent the condenser coils 30 from contacting the bottom surface 23a of the condenser housing 22 and thereby permit air to flow up through the bottom 30a of the condenser coils 30. For example, as depicted in FIGS. 7 and 8, the condenser system 20 may include at least one, two, or three condenser coil supports 36 coupled to the bottom surface 23 of the condenser housing 22. The supports 36 may be any shape or size and a particular shape and/or size can be chosen by one skilled in the art for a specific purpose. In the embodiment depicted in FIGS. 7 and 8, each support 36 includes an angled article extending along the bottom surface 23 of the condenser housing 22. In such embodiments, the supports 36 may contact the bottom surface 30a of the condenser coils 30 to provide support to the condenser coils 30, thereby creating a gap 37 between the bottom surface 30a of the condenser coils 30 and the bottom surface 23 of the condenser housing 22, which may increase airflow up through the condenser coils 30 and up through the fans 34.

In certain embodiments, the condenser coils 30 may include one or more covering materials 38 and/or 39 to cover portions of the condenser coils 30. For example, in the embodiment depicted in FIGS. 7 and 8, the condenser system 20 may include a top-covering material 38 that covers the top surface 30b of the condenser coils 30. The covering materials 38 and 39 can be any material suitable for covering a portion of the condenser coils 30 known to one skilled in the art.

In the embodiment depicted in FIGS. 7 and 8, the top covering material 38 may be utilized to aid in mounting the fans 34 onto the condenser coils 30. For example, the top covering material 38 may include alignment members 38a for use in mounting the fans 34 onto the condenser coils 30 at specific positions. In such embodiments, the fans 34 may include complimentary attachment members 34a that can attach to the alignment members 38a. The attachment members 34a and the alignment members 38a may be any shape or size as long as the fans 34 can be coupled to the condenser coils 30 at a position specified by the alignment members 38a. In such embodiments, once the fans 34 are aligned at a specific location, the fans 34 may be secured in place using any attachment device known to one skilled in the art, such as, for example, with the use of screws and/or bolts. Further, as shown in the embodiment depicted in FIG. 7, the top covering material 38 may include a though-opening 38b complimentary in shape to one of the fans 34 in order to allow air to flow through the condenser coils 30 and up through the fans 34.

Further, as shown in the embodiment depicted in FIGS. 7 and 8, the condenser coils 30 may include an edge covering material 39, which may protect the edge of the condenser coils 30 and permit for the secure mounting of the condenser coils 30 inside the condenser housing 22. In certain embodiments, the edge covering material 39 may extend along all or part of the edges of the condenser coils 30.

In certain embodiments, the condenser system 20 may include condenser coil mounts 41. For example, the condenser system 20 of FIG. 8 may include mounts 41 for securing the condenser coils 30 within the condenser housing 22. In one or more embodiments, the mounts 41 may be attached to the edge covering material 39 and secured to the bottom surface 23 of the condenser housing 22. In such embodiments, the mounts 41 may serve to secure the condenser coils 30 up from the bottom surface 23 of the condenser housing 22, thereby leaving a gap 37 for air to flow up through the condenser coils 30. As best seen in FIG.

6, the condenser system 20 may include at least four condenser mounts 41 near each of the corners of the condenser coils 30.

In certain embodiments, the condenser system 20 may have a cooling capacity such that a vehicle air conditioning system is able to cool the entire, or at least a portion of, the interior of a vehicle 10, e.g., the interior of the patient compartment 12 and/or the interior of the driver compartment 14. In one or more embodiments, the condenser system 20 may have a cooling capacity of at least about 85,000 btu/hr, 90,000 btu/hr, 95,000 btu/hr, or 100,000 btu/hr.

As discussed above, in certain embodiments, the condenser system 20 may include a solar panel 40. The solar panel 40 may be any type of commercially available solar panel known to one skilled in the art, such as, for example, a 1.2 amp solar panel. In certain embodiments, the solar panel 40 may be utilized as a trickle charger to condition the vehicle batteries.

Figure 9:
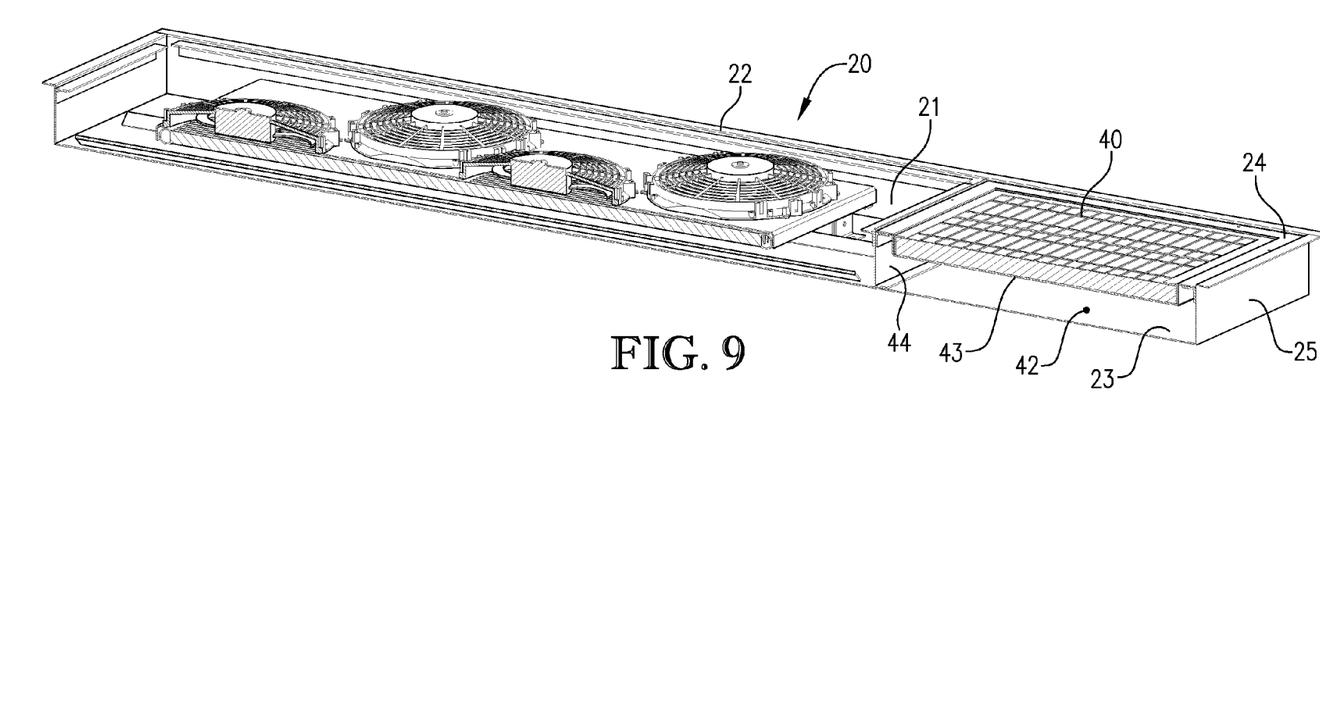
FIG. 9 is a top perspective and cross-sectional view of the condenser system of FIG. 7, particularly showing a solar panel coupled to the top surface of the condenser housing and a cavity underneath the solar panel on the inside of the condenser housing.

As shown in the embodiment depicted in FIG. 9, the solar panel 40 may be coupled to the top surface 24 of the condenser housing 22. In one or more embodiments, the solar panel 40 may be coupled to the top surface 24 of the condenser housing 22 such that both the solar panel 40 and the top surface 24 of the condenser housing 22 are substantially flush with the vehicle roof 18 adjacent to the condenser housing 22.

In certain embodiments, the condenser housing 22 may include an intermediate bottom surface 43 that may partly or entirely separate the solar panel 40 from the remainder of the condenser housing interior 21. Further, in such embodiments, the condenser housing 22 may include an intermediate sidewall 44 to thereby create a cavity 42 defined by the sidewall 44, the intermediate bottom surface 43, the bottom surface 23, and the sidewall 25. The cavity 42 may provide space for equipment used in conjunction with the condenser system 20, such as, for example, a fan controller 56 that will be discussed in detail below.

As discussed above, the condenser system 20 of the present invention may be used as part of an air conditioning system 50 for a vehicle 10. As can be seen in the embodiment depicted in FIG. 10, the air conditioning system 50 may include a heat transfer circuit 52, which may include a compressor 53, one or more condenser coils 30, an expansion valve 54, and an evaporator 55, all in fluid communication with one another such that a heat transfer medium can flow throughout the heat transfer circuit 52. Further, in the embodiment depicted in FIG. 10, the air conditioning system 50 may include a condenser system 20, which may include one or more condenser coils 30, a sensor 58, and a fan controller 56. In one or more embodiments, the foregoing description of the condenser system 20 with respect to FIGS. 1-9 applies to the air conditioning system 50 depicted in FIG. 10 and described below.

Figure 10:
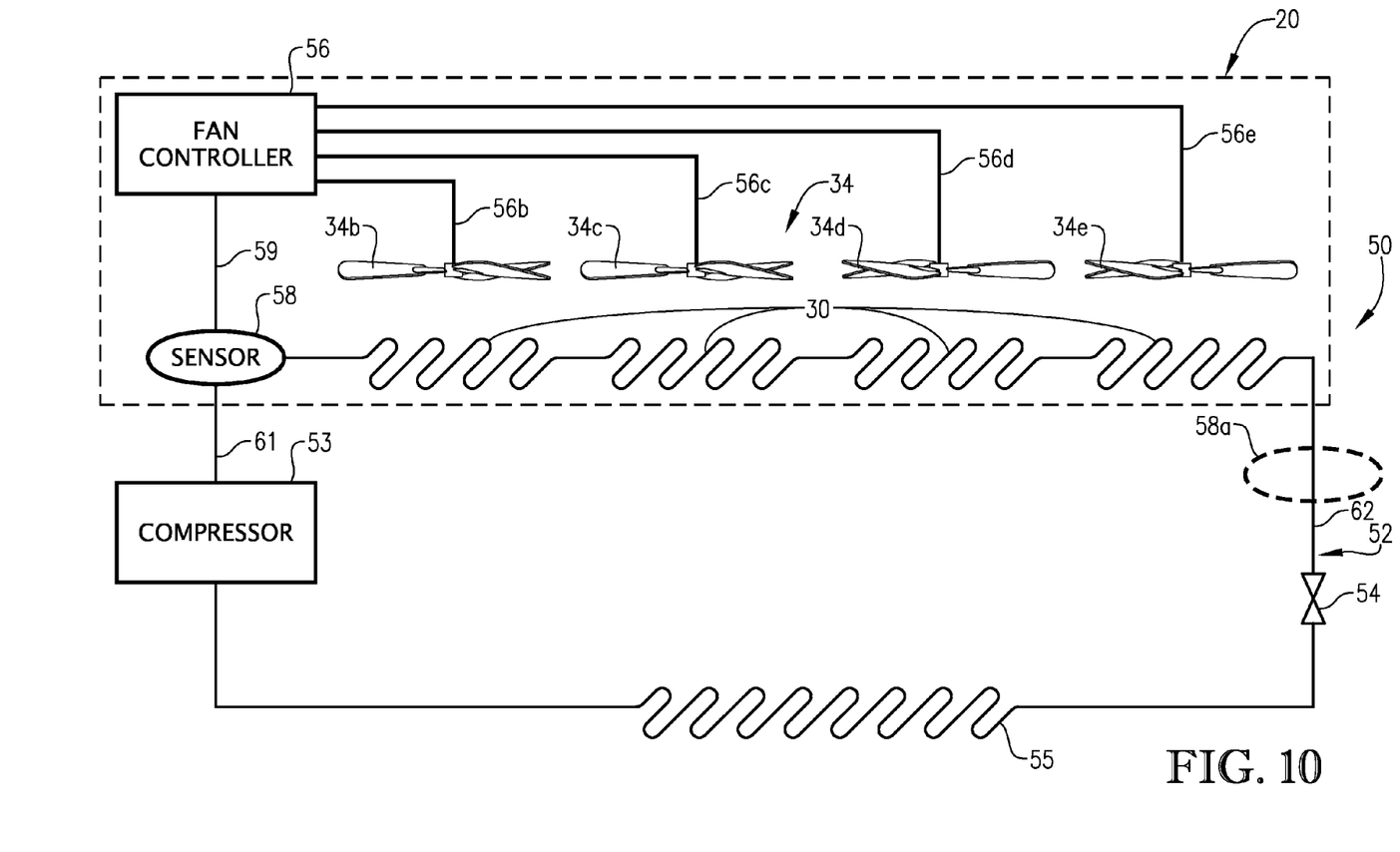
FIG. 10 is a schematic of an air conditioning system in according with one embodiment of the present invention, particularly showing four fans coupled to a fan controller and a sensor coupled to the heat transfer circuit of the air conditioning system.

In the heat transfer circuit 52, a heat transfer medium can be compressed in the compressor 53 into a hot high-pressure fluid, which then flows into the condenser coils 30. A plurality of fans 34, e.g., fans 34b-e, may be used to aid in partially cooling the fluid inside the condenser coils 30 by supplying blowing air to the condenser coils 30. The heat transfer medium can then exit the condenser coils 30, flow through an expansion valve 54, which decreases the pressure of the heat transfer medium thereby further cooling it. The heat transfer medium then flows on to an evaporator 55, which can provide cooling air. The heat transfer medium then flows from the evaporator 55, back to the compressor 53 to start the cycle over.

In certain embodiments, it may be desirable to control the activation and/or deactivation of the plurality of fans 34 in order to conserve power. In one or more embodiments, the plurality of fans 34 may include at least two, three, or four fans. For example, in the embodiment depicted in FIG. 10, the condenser system 20 may include four fans 34b-e. In such embodiments, the condenser system 20 may include a fan controller 56 that can automatically activate and/or deactivate each fan of the plurality of fans 34, based on a load indicating parameter of the heat transfer circuit 52. In such embodiments, the fan controller 56 may be coupled to a sensor 58 that can detect a load indicating parameter value of the heat transfer circuit 52, which can be sent to and received by the fan controller 56. Further, in such embodiments, the fan controller 56 may be operable to selectively activate and/or deactivate at least one fan of the plurality of fans 34 based the load indicating parameter value detected by the sensor 58.

The fan controller 56 may be any electronic device that is capable of receiving a signal from a sensor 58 and activating and/or deactivating each fan of a plurality of fans 34, and a particular controller may be chosen by one skilled in the art for a specific system. In certain embodiments, the fan controller 56 may include a computer and/or a programmable logic controller (PLC).

The fan controller 56 can be coupled to the sensor 58 in any manner known to one skilled in the art as long as the fan controller 56 is capable of receiving a load indicating parameter value communicated from the sensor 58 to the fan controller 56. For example, in one or more embodiments, the fan controller 56 and sensor 58 may be coupled together via a communication line 59, e.g., a wire. In certain other embodiments, the fan controller 56 and the sensor 58 may be coupled to one another via a wireless connection.

In certain embodiments, the sensor 58 may be any type of sensor capable of measuring a load indicating parameter of the heat transfer circuit 52, such as, for example, a pressure sensor, a temperature sensor, or a flow rate sensor. Various sensors 58 capable of measuring a load indicating parameter of the heat transfer circuit 52 are commercially available and one skilled in the art may chose a specific sensor for a particular system.

In one or more embodiments, the load indicating parameter can include various properties of the heat transfer medium, such as, for example, the pressure of the heat transfer medium in the heat transfer circuit 52, the temperature of the heat transfer medium in the heat transfer circuit 52, or the flow rate of the heat transfer medium in the heat transfer circuit 52. In a preferred embodiment, the load indicating parameter may include the pressure of the heat transfer medium in the heat transfer circuit 52, and the sensor 58 may be a pressure sensor that is operable to measure the pressure of the heat transfer medium in the heat transfer circuit 52.

In certain embodiments, the sensor 58 may be coupled to the heat transfer circuit 52 at any position along the heat transfer circuit 52, and a specific position can be chosen by one skilled in the art for a particular purpose. In one or more embodiments, the sensor 58 may be positioned downstream of the compressor 53 and upstream of the condenser coils 30, e.g., at position 61. In certain embodiments, the sensor 58 may be positioned at the condenser discharge side 62 of the condenser coils 30, as denoted by the phantom sensor 58a in FIG. 10.

In certain embodiments, the fan controller 56 may be operable to activate and/or deactivate at least two, three, or four fans 34 based on a distinct load indicating parameter value for each fan. For example, in one or more embodiments, a first fan 34b may be activated at a first load indicating parameter value, a second fan 34c may be activated at a second load indicating parameter value, a third fan 34d may be activated at a third load indicating parameter value, and a fourth fan 34e may be activated at a fourth load indicating parameter value. In such embodiments, the first, second, third, and fourth load indicating parameter values, may be first, second, third, and fourth threshold pressure values, respectively, of the heat transfer medium in the heat transfer circuit 52. A "threshold pressure value" refers to a specific pressure at which a particular fan, e.g., 34b, may be activated.

In certain embodiments, the fan controller 56 may activate each of a plurality of fans 34 in a staggered manner so that each fan is only activated if the condenser system 20 requires the added cooling provided by an additional fan. For example, in one or more embodiments, the first threshold pressure value may be at least 120, 130, or 140 psi, and/or not more than 200, 190, or 180 psi. In such embodiments, the second threshold pressure value may be at least at least 5, 10, or 15 psi greater than the first threshold pressure value, and/or not more than 50, 45, or 35 psi greater than the first threshold pressure value. Further, in such embodiments, the third threshold pressure value may be at least 5, 10, or 15 psi greater than the second threshold pressure value, and/or not more than 50, 45, or 35 psi greater than the second threshold pressure value. In such embodiments, the fourth threshold pressure value may be at least 5, 10, or 15 psi greater than the third threshold pressure value, and/or not more than 50, 45, or 35 psi greater than the third threshold pressure value. In a preferred embodiment, the first threshold pressure value may be about 160 psi, the second threshold pressure value may be about 180 psi, the third threshold pressure value may be about 200 psi, and the fourth threshold pressure value may be about 220 psi.

In one or more embodiments, the fan controller 56 may deactivate each fan of a plurality of fans 34 in a staggered manner so that the condenser system 20 may conserve energy when one or more of the fans 34 are not needed. For example, in certain embodiments, the fan controller 56 may deactivate the first fan 34b, second fan 34c, third fan 34d, and fourth fan 34e at a pressure that is at least 50 psi, 40 psi, 30 psi, 20 psi, 10 psi, 7 psi, 5 psi, or 3 psi less than the first, second, third, and fourth threshold pressure values, respectively.

It should be understood that while the foregoing discusses utilizing the fan controller 56 to stagger the activation and/or deactivation of the fans 34 based on threshold pressure values, in certain embodiments, the fan controller 56 may also be used to stagger the activation and/or deactivation of the fans 34 based on other load indicating parameters. Specific load indicating parameter values for the staggered activation and/or deactivation of the fans 34 by the fan controller 56 can be chosen by one skilled in the art for a specific purpose.

As discussed above, in certain embodiments, the fan controller 56 may selectively control the activation and/or deactivation of each individual fan 34b-e. In such embodiments, the fans 34b-e may be independently controlled by the fan controller 56 by any mechanism or device known to one skilled in the art. For example, in certain embodiments, such as that depicted in FIG. 10, the fans 34b-e may be independently controlled by the fan controller 56 via separate power connections 56b-e connected to fans 34b-e, respectively, and to the fan controller 56. In such embodiments, the fan controller 56 may automatically activate and/or deactivate each fan 34b-e by cycling the power on or off to each fan 34b-e.

As discussed above, in certain embodiments, the condenser system 20 may selectively activate one or more fans 34 based on a load indicating parameter of the heat transfer circuit 52. In one or more embodiments, it may be desirable to even out the runtime and/or wear on the fans 34 so that the same fan, e.g., 34b, does not get turned on at the same specific load indicating parameter value throughout the life of the condenser system 20. For example, in certain embodiments, the fan controller 56 may be operable to activate and/or deactivate each fan of a plurality of fans 34 based on a distinct load indicating parameter value for each fan, e.g., 34b. In such embodiments, the fan controller 56 may be operable to vary which fan of a plurality of fans 34 is activated and/or deactivated at a first load indicating parameter value so as to equalize wear on the plurality of fans 34. Further, in such embodiments, the fan controller 56 may be operable to vary which fan of a plurality of fans 34 is activated and/or deactivated at all distinct load indicating parameter values that are utilized in a particular condenser system 20. For example, in certain embodiments, the fan controller 56 may be operable to vary which fan of a plurality of fans is activated at a second load indicating parameter value, a third load indicating parameter value, and/or a fourth load indicating parameter value.

The fan controller 56 may utilize any mechanism known to one skilled in the art in order to vary which fan of a plurality of fans 34 is activated and/or deactivated at each load indicating parameter value. In certain embodiments, the fan controller 56 may be coupled to a vehicle's power source so that cycling the power on and off from the power source to the fan controller 56 may cause the fan controller 56 to vary which fan of a plurality of fans 34 gets activated and/or deactivated at a first, second, third, and/or fourth load indicating parameter value. For example, in such embodiments, the cycling of the power on and off may cause the fan controller 56 to assign fans 34b, c, d, and e, to be activated and/or deactivated at a first, second, third, and fourth load indicating parameter value, respectively, and a subsequent cycling of the power on and off may cause the fan controller 56 to re-assign fans 34b, c, d, and e to be activated and/or deactivated at different load indicating parameter values than the prior cycling of the power.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a system is described as containing components A, B, and/or C, the system can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

Claims Not Limited To Disclosed Embodiments

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A vehicle air conditioning condenser system for cooling a heat transfer medium flowing through a heat transfer circuit of a vehicle air conditioning system that includes one or more roof-mounted condenser coils, said condenser system comprising:
   a condenser housing for housing said roof-mounted condenser coils on a roof of a vehicle, wherein said condenser housing includes a top surface in the form of a porous cover, with said porous cover being horizontal and substantially flush with the roof of the vehicle, wherein no portion of said air conditioning condenser system extends more than two inches above the roof of the vehicle;
   a sensor operable to measure at least one load indicating parameter of said heat transfer circuit;
   at least three roof-mounted fans operable to supply blowing air to said roof-mounted condenser coils; and
   a fan controller coupled to said sensor and said plurality of fans and operable to receive said load indicating parameter from said sensor,
   wherein said fan controller is operable to automatically activate or deactivate one fan of said at least three fans without simultaneously activating or deactivating another fan of said at least three fans,
   wherein the automatic activation or deactivation of the one fan is based on a distinct value of said load indicating parameter,
   wherein said fan controller is operable to assign a first of said at least three fans to be activated or deactivated at a first load indicating parameter value, wherein said fan controller is operable to assign a second of said at least three fans to be activated or deactivated at a second load indicating parameter, and wherein said fan controller is operable to assign a third of said at least three fans to be activated or deactivated at a third load indicating parameter,
   wherein said fan controller is operable to re-assign each of said at least three fans to be activated or deactivated at a different load indicating parameter value than to which said fan was previously assigned.

2. The system according to claim 1, wherein said load indicating parameter comprises: the pressure of said heat transfer medium in said heat transfer circuit; the temperature of said heat transfer medium in said heat transfer circuit; or the flow rate of said heat transfer medium in said heat transfer circuit.

3. The system according to claim 2, wherein said load indicating parameter comprises the pressure of said heat transfer medium in said heat transfer circuit, and wherein said sensor is a pressure sensor operable to measure the pressure of said heat transfer medium in said heat transfer circuit.

4. The system according to claim 3, wherein said pressure sensor is operable to measure the pressure of the heat transfer medium on the discharge side of said one or more condenser coils.

5. The system according to claim 1, wherein said at least three fans includes the first fan, the second fan, the third fan, and a fourth fan, wherein said first fan is activated at the first load indicating parameter value, wherein said second fan is activated at the second load indicating parameter value, wherein said third fan is activated at the third load indicating parameter value, and wherein said fourth fan is activated at a fourth load indicating parameter value.

6. The system according to claim 5, wherein said load indicating parameter comprises the pressure of said heat transfer medium in said heat transfer circuit, wherein said first, second, third, and fourth load indicating parameter values are first, second, third, and fourth threshold pressure values, respectively, of said heat transfer medium in said heat transfer circuit.

7. The system according to claim 6, wherein said second threshold pressure value is at least 5 psi greater than said first threshold pressure value, wherein said third threshold pressure value is at least 5 psi greater than said second threshold pressure value, wherein said fourth threshold pressure value is at least 5 psi greater than said third threshold pressure value.

8. The system according to claim 7, wherein said first threshold pressure value is at least 120 psi and not more than 200 psi.

9. The system according to claim 7, wherein said process further comprises deactivating said first, second, third, and fourth fans at a pressure that is at least 10 psi less than said first, second, third, and fourth threshold pressure values, respectively.

10. The system according to claim 1, wherein said fan controller is operable to vary which fan of said at least three fans is activated or deactivated at said first load indicating parameter value so as to equalize wear on said at least three fans.

11. The system according to claim 1, wherein said condenser housing further comprises a bottom surface and at least one sidewall, wherein at least one of said condenser coils is positioned between said top and bottom surfaces.

12. The system according to claim 11, wherein said at least three fans are positioned above at least a portion of said at least one of said one or more condenser coils and at least a portion of said at least three fans is positioned beneath said top surface of said condenser housing.

13. The system according to claim 1, wherein said condenser system has a capacity of at least 85,000 btu/hr.

14. The system according to claim 1, wherein said vehicle is an emergency vehicle comprising a patient compartment and a driver compartment, wherein said condenser system is configured for attachment to the top of said patient compartment.

15. A process for controlling a roof-mounted air conditioning condenser system that cools a heat transfer medium flowing through a heat transfer circuit of an air conditioning system of a vehicle, said process comprising:
(a) using at least three roof-mounted condenser fans to circulate air through one or more roof-mounted condenser coils, wherein said one or more roof-mounted condensing coils are housed in a condenser housing on a roof of the vehicle, wherein said condenser housing includes a top surface being horizontal and substantially flush with the roof of the vehicle;
(b) simultaneously with step (a), sensing a load indicating parameter of said heat transfer circuit;
(c) based on said load indicating parameter, automatically activating or deactivating at least one of said condenser fans without simultaneously activating or deactivating another of said condenser fans;
(d) assigning, via a fan controller, a first of said at least three fans to be activated or deactivated at a first load indicating parameter value, a second of said at least three fans to be activated or deactivated at a second load indicating parameter, and a third of said at least three fans to be activated or deactivated at a third load indicating parameter;
(e) re-assigning, via the fan controller, each of said at least three fans to be activated or deactivated at a different load indicating parameter value than said fan was initially assigned; and
(f) charging a vehicle battery via a roof-mounted solar panel associated with the roof-mounted air conditioning condenser system, wherein the solar panel is horizontal and substantially flush with the roof of the vehicle.

16. The process according to claim 15, wherein said load indicating parameter comprises the pressure of said heat transfer medium in said heat transfer circuit.

17. The process according to claim 15, wherein said process further comprises varying which fan of said at least three fans is activated or deactivated at said first load indicating parameter value so as to equalize the wear on said at least three fans.

18. The process according to claim 17, wherein cycling power from said vehicle battery between on and off causes the fan controller to vary which fan of said at least three fans is activated or deactivated at said first load indicating parameter.

19. An emergency vehicle comprising:
a vehicle body comprising a patient compartment and a driver compartment;
an air conditioning system having a capacity of at least 85,000 btu/hr, wherein said air conditioning system comprises a heat transfer circuit, a heat transfer medium, and a condenser system,
wherein said heat transfer circuit is configured to circulate said heat transfer medium therethrough, wherein said heat transfer circuit comprises one or more condenser coils attached to the roof of said patient compartment; and
a condenser housing for housing said one or more condenser coils on the roof of said patient compartment, wherein said condenser housing comprises a top surface, a bottom surface, and sidewalls, wherein said sidewalls entirely surround said one or more condenser coils, wherein said condenser housing is positioned within an opening formed in the roof of said patient compartment, wherein said top surface of said condenser housing is horizontal and is flush with the roof of said patient compartment, and wherein said top surface of said condenser housing extends across the entire opening formed in the roof of said patient compartment,
wherein said condenser system comprises a pressure sensor, at least three fans, and a fan controller, wherein said pressure sensor is operable to measure a pressure of said heat transfer medium in said heat transfer circuit and generate a pressure signal based on the measured pressure, wherein said at least three fans are operable to supply blowing air to at least a portion of said condenser coils, wherein said fan controller is operable to receive said pressure signal and selectively activate and deactivate individual fans of said at least three fans based on said pressure signal,
wherein said fan controller is operable to assign a first of said at least three fans to be activated or deactivated at a first load indicating parameter value, wherein said fan controller is operable to assign a second of said at least three fans to be activated or deactivated at a second load indicating parameter, and wherein said fan controller is operable to assign a third of said at least three fans to be activated or deactivated at a third load indicating parameter,
wherein said fan controller is operable to re-assign each of said at least three fans to be activated or deactivated at a different load indicating parameter value than the fan was initially assigned.

20. The vehicle according to claim 19, wherein at least one of said one or more condenser coils are positioned between said top and bottom surfaces of said condenser housing.

21. The vehicle according to claim 20, wherein said condenser housing has a maximum thickness, measured between said top and bottom surfaces, of less than 6 inches.

22. The vehicle according to claim 19, wherein said fan controller is operable to vary which fan of said at least three fans is activated or deactivated at said first load indicating parameter value so as to equalize wear on said at least three fans.

* * * * *